United States Patent [19]
Kitchens

[11] Patent Number: 5,193,486
[45] Date of Patent: Mar. 16, 1993

[54] CONVERTIBLE PET CARRIER

[76] Inventor: Corliss A. Kitchens, 640 Ft. Washington Ave., #3C, New York, N.Y. 10040

[21] Appl. No.: 856,293

[22] Filed: Mar. 23, 1992

[51] Int. Cl.⁵ .......................................... A01K 29/00
[52] U.S. Cl. ................................................ 119/96
[58] Field of Search ................ 119/96, 101, 102, 106, 119/19; 294/137, 140, 141, 142, 156

[56] References Cited

U.S. PATENT DOCUMENTS 1,595,834  8/1926  Griffiths .................................. 119/96
4,530,309  7/1985  Collins .................................... 119/96

FOREIGN PATENT DOCUMENTS 1194738  10/1985  Canada ................................. 119/101
2577382  8/1986  France ................................... 119/83

Primary Examiner—John G. Weiss
Attorney, Agent, or Firm—Abdallah & Muckelroy

[57] ABSTRACT

A pet carrier that can be selectively converted to a pet jacket. The pet carrier includes a flexible bag-like body member having a neck brace at a forward end, a torso support portion and a hind leg support portion at a rearward end. A pair of strap handles are attached to respective sides of the body member. The pet carrier is converted to a pet jacket by reversing and folding the rearward end of the body member over the forward end of the body member.

13 Claims, 2 Drawing Sheets

CONVERTIBLE PET CARRIER

BACKGROUND OF THE INVENTION

The present invention generally relates to portable pet carriers. More specifically, this invention relates to a portable pet carrier that can be converted into a pet jacket.

Pet owners encounter considerable difficulty attempting to transport a pet. Pets cannot be easily carried by hand and generally become excited or frightened in a moving vehicle. Thus, pets usually must be restrained for transport.

Various pet carriers are known in the prior art for transporting a pet. A commonly-known pet carrier substantially comprises a rigid, perforated box. This type of pet carrier is generally unsuitable for transporting a pet on a crowded public transportation system. Neither is the rigid box pet carrier suitable for hand-carrying a pet for a long distance due to its heavy and unwieldy construction. Flexible, lightweight pet carriers are also known in the prior art. While flexible pet carriers overcome the weight limitations of the rigid box pet carriers, in use they generally simulate the structure shape and restraint means of the rigid pet carriers, that is, pets are substantially completely caged by these carriers. Furthermore, the pet carriers of the prior art must be stored or carried by the pet owner when not being used to transport a pet.

Pets are less irritable and less frightened, and therefore, more easily transported, when they are restrained in a comfortable position, for example a seated position. A preferred pet carrier would also allow the head and tail of the pet to extend unrestricted during transport. Further, many small pets become tired from walking and then must be carried. Thus, a pet carrier that can be alternately utilized as a pet jacket and a pet carrier is also desirous.

SUMMARY OF THE INVENTION

The present invention is a pet carrier that restrains and supports a pet in a seated position. The pet carrier of this invention also can be converted into a pet jacket, thereby permitting the pet carrier to be transported by the pet when not being used to transport the pet.

In view of the foregoing, the pet carrier of the present invention comprises a flexible bag-like body member having a neck brace attached to a forward end of the body member and a pair of strap handles attached to respective sides of the body member. The body member includes a torso support portion and a hind leg support portion. The hind leg portion is integrally formed with a rearward end of the torso support portion. The forward end of the torso support portion is open and the rearward end thereof includes a V-shaped cut-out portion communicating with the torso support portion and the hind leg support portion. A selectively closeable slit extends along the top portion of the torso support portion. Cooperating fastening means are respectively disposed on the outside surface of the torso support portion at the forward end thereof and on the inside surface of the torso support portion at the rearward end thereof. The pet carrier is converted to a pet jacket by reversing and folding the rearward end of the body member over the forward end of the body member and attaching the cooperating fastening means. The inside surface of the torso support portion, which is outwardly exposed when the pet carrier is converted to a pet jacket, preferably includes an ornamental design.

DESCRIPTION OF A PREFERRED EMBODIMENT

Figure 1:
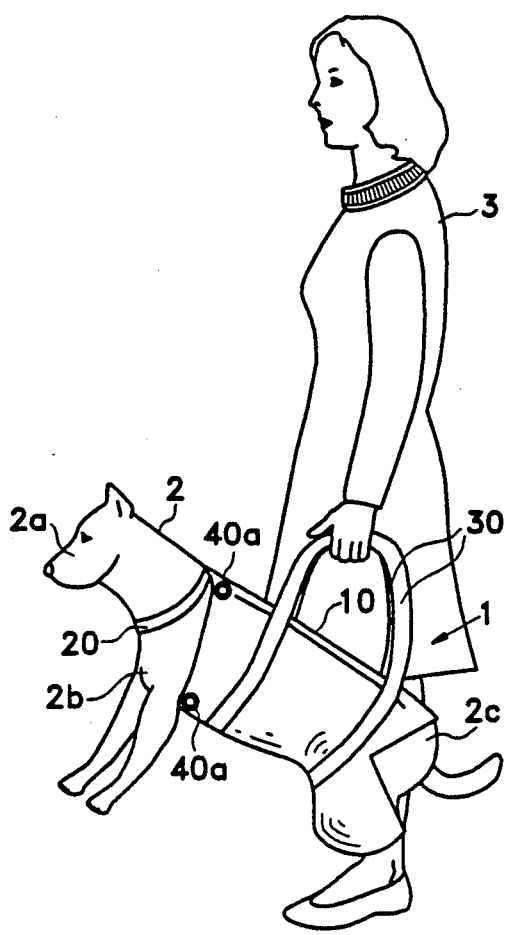
FIG. 1 is a side elevation view of the present invention disposed in its carrier position illustrating its attachment to a pet.

FIG. 1 illustrates in a side elevational view the convertible pet carrier 1 of the present invention disposed in its carrier position. Pet carrier 1 generally comprises a bag-like body member 10, a neck brace 20 attached to a forward end of the body member 10, and a pair of strap handles 30 fixedly attached to and extending from respective sides of the body member 10. A pet 2 is retained in a seated position in pet carrier 10 when being transported by a pet owner 3. The head 2a of the pet 2 extends through neck brace 20 which engages the neck 26 of the pet 2. The rear end and tail 2c of the pet 2 extends through a cut-out portion 10b at the rearward end of the body member 10.

Figure 2:
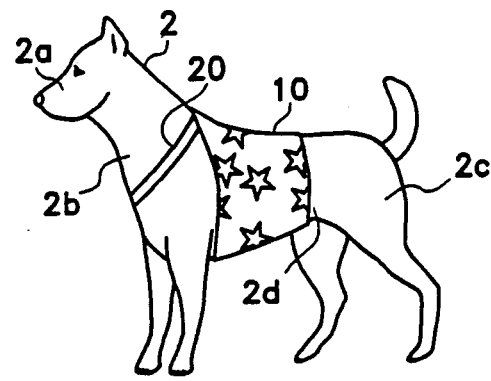
FIG. 2 is a side elevation view of the present invention disposed in its jacket position illustrating its attachment to a pet.

As illustrated in FIG. 2, when pet carrier 1 is disposed in the pet jacket position the neck brace 20 remains about the neck 26 of pet 2 and the body member 10 extends about the torso 21 of the pet 2 as hereinafter described in greater detail.

Figure 3:
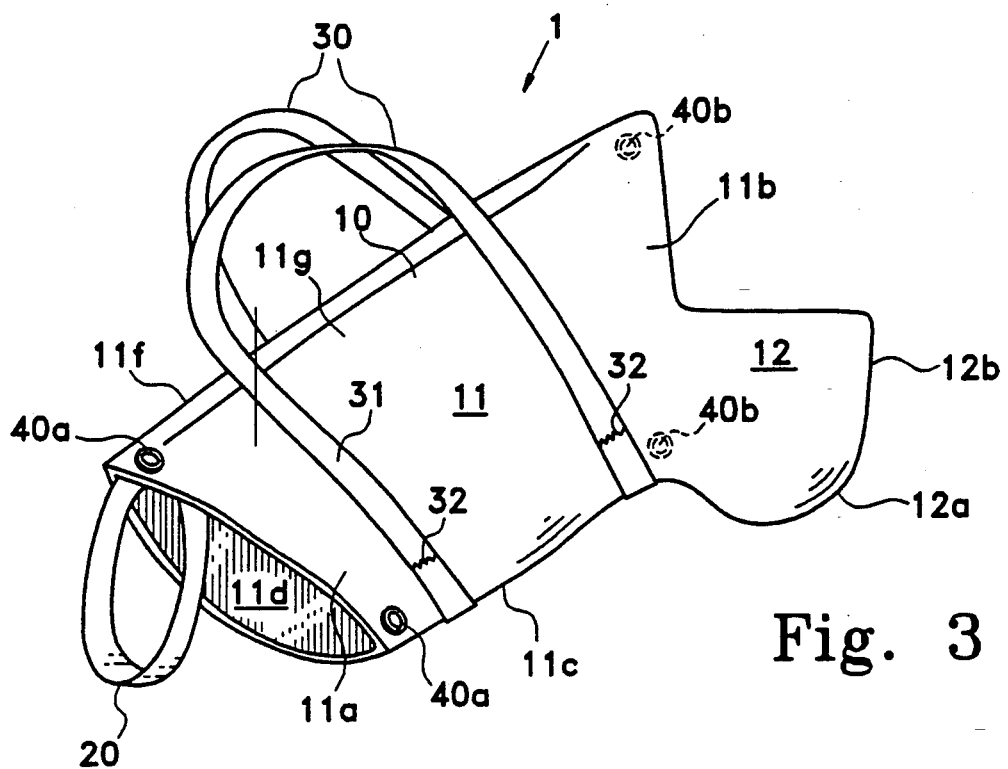
FIG. 3 is a front side perspective view of the pet carrier disposed in its carrier position.
Figure 4:
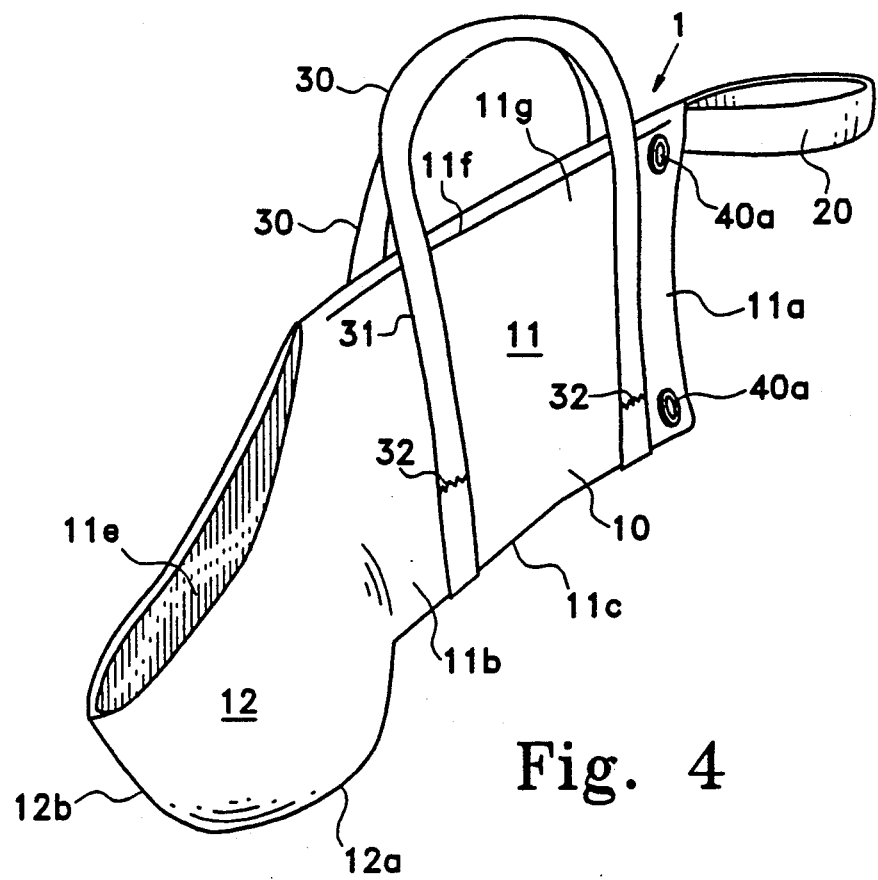
FIG. 4 is a rear side perspective view of the pet carrier disposed in its carrier position.

Referring now to FIGS. 3 and 4, respective front and rear side perspective views of the pet carrier 1 of the present invention, it can be better seen that bag-like body member 10 includes a torso support portion 11 and a hind legs support portion 12 integrally formed at a lower portion of the rearward end 11b of the torso support portion 11. Neck brace 20 is fixedly attached to opposing sides of an upper portion of the forward end 11a of torso support portion 11. Strap handles 30 are preferably defined by a continuous belt loop 31 extending around the bottom portion 11c of the torso support portion 11 of body member 10 at first and second positions adjacent the respective forward end 11a and rearward end 11b of torso support portion 11. The belt loop 31 is fixedly attached by stitching means 32 to respective sides of the torso support portion 11, preferably proximate to the bottom portion 11c of torso support portion 11. The extension of belt loop 31 about the bottom portion 11c of torso support portion 11 provides additional support for a pet 2 being transported in pet carrier 1.

The forward end 11a of torso support portion 11 includes an opening 11d which communicates with the inside of torso support portion 11. The rearward end 11b of torso support portion 11 includes a substantially V-shaped cut-out portion 11c which communicates with the insides of the torso support portion 11 and the hind legs support portion 12.

Hind legs support portion 12 is preferably formed having a curved bottom 12a which facilitates cup engagement of the hind legs of a pet 2 (FIG. 1). Thus, a pet 2 can be transported in a seated position. The rearward end 12b of the hind legs support portion 12 preferably extends sufficiently upward from the bottom 12a thereof to engage the thigh portion of a pet 2 within the hind legs support portion 12. Thus, a pet 2 cannot therefore easily remove the hind legs from hind legs support portion 12.

Pet carrier 1 further includes a selectively closeable slit 11f extending along the top portion 11g of torso support portion 11 and cooperating fastening means 40a, 40b respectively disposed on respective inside and outside portions of the sides of torso support portion 11. Slit 11f may be selectively closeable by VELCRO hook and loop tape or by a zipper attached to slit 11f. Slit 11f provides means for insertion of a pet 2 into pet carrier 1.

The cooperating fastening means 40a, 40b provide means to retain the pet carrier 1 in its jacket position. In the preferred embodiment of pet carrier 1 illustrated in the several drawings cooperating fastening means 40a, 40b comprises first and second elements 40a, 40b of snap fasteners as generally known in the art. First snap fastener element 40a, preferably including a pair of such elements, is fixedly attached to the outside surface of the torso support portion 11 of body member 10 at the forward end 11a thereof. Second snap fastener element 40b (FIG. 5) is fixedly attached to the inside surface of the torso support portion 11 at the rearward end thereof.

Figure 6:
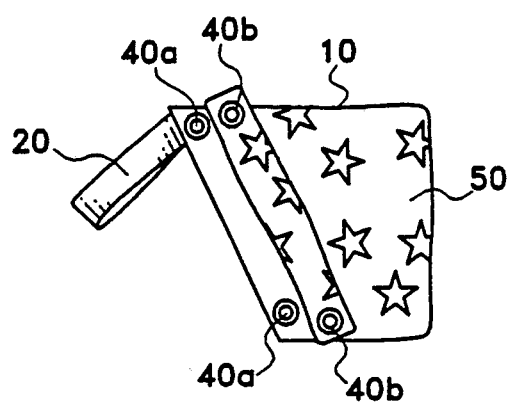
FIG. 6 is a side elevational view of the present invention illustrating a second step in converting the pet carrier from its carrier position to its jacket position.
Figure 5:
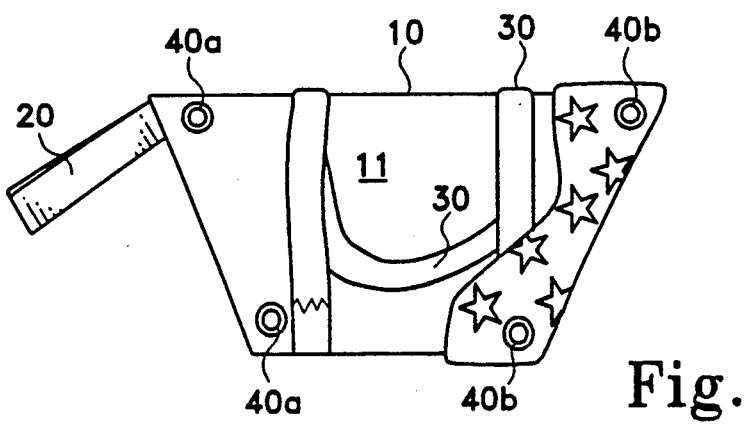
FIG. 5 is a side elevational view of the present invention illustrating a first step in converting the pet carrier from its carrier position to its jacket position.

The conversion of pet carrier 1 from its carrier position to its jacket position is illustrated in FIGS. 5 and 6. Strap handles 30 are laid across the top portion 11g of torso support portion 11 allowing the strap handles 30 to lay adjacent to the opposing sides of the torso support portion 11. The hind legs portion 12 of body member 10 and the rearward end 11b of torso support portion 11 are reverse folded and brought adjacent to the torso support portion 11 as illustrated in FIG. 5. The second snap fastener element 40b is thus turned outwardly adjacent the sides of torso support portion 11. The rearward half of body member 10, thus folded, is then folded toward the forward end 11a of torso support portion 11 and second element 40b is engaged with first snap fastener element 40a for fixed attachment of pet carrier 1 in its jacket position. Strap handles 30 are thereby enclosed with the folded body member 10. The inside surface of body member 10 preferably includes an ornamental design 40 which is outwardly exposed when pet carrier 1 is configured in its jacket position.

Various changes, modifications and additions may be made to the foregoing preferred embodiment of the present invention without departing from its spirit and scope. Such changes, modifications and additions within a fair reading of the appended claims are intended as part of this disclosure.

Therefore in view of the foregoing, I claim:

1. A convertible pet carrier selectively disposable in a pet carrier position and a pet jacket position, said pet carrier comprising
    a flexible bag-like body member having an inside surface, an outside surface and an open forward end, said body member including a torso support portion which engages in peripheral support a pet torso, and a hind legs support portion integrally formed with a rearward portion of said torso support portion which engages in peripheral support the hind legs of a pet;
    a neck brace attached to the open forward end of said body member; and
    a pair of strap handles attached to respective sides of the outside surface of said body member.

2. A convertible pet carrier as in claim 1 wherein said body member further includes a cut-out portion at a rearward end of said body member communicating with said torso support portion and said hind legs support portion.

3. A convertible pet carrier as in claim 2 wherein said cut-out portion defines a V-shaped opening extending from a top portion of the torso support portion to a rearward portion of the hind legs support portion.

4. A convertible pet carrier as in claim 1 further including a slit extending along the top portion of said torso support portion from a forward end of said torso support portion to a rearward end of said torso support portion.

5. A convertible pet carrier as in claim 4 wherein said slit is selectively closeable by slit fastening means.

6. A convertible pet carrier as in claim 5 wherein said slit fastening means comprises a zipper.

7. A convertible pet carrier as in claim 5 wherein said slit fastening means comprises hook and loop tape fastener means.

8. A convertible pet carrier as in claim 4 further including a pet jacket conversion fastening means.

9. A convertible pet carrier as in claim 8 wherein said pet jacket conversion fastening means comprises first and second cooperating fastening means respectively disposed on the outside surface of the torso support portion at a forward end thereof and the inside surface of the torso support portion at a rearward end thereof.

10. A convertible pet carrier as in claim 9 wherein said cooperating fastening means comprises at least one snap fastener.

11. A convertible pet carrier as in claim 9 wherein said first cooperating fastening means comprises at least one button and said second cooperating fastening means comprises at least one buttonhole.

12. A convertible pet carrier as in claim 1 wherein said pair of strap handles are defined by a continuous belt loop extending below the torso support portion at respective positions of the torso support portion approximate the forward and the rearward end thereof.

13. Convertible pet carrier selectively disposable in a pet carrier position and a pet jacket position, said pet carrier comprising
    a flexible bag-like body member having an inside surface and an outside surface, said body member including a torso support portion and a hind legs support portion, said hind legs support being integrally formed at a lower rearward end of said torso support portion, a forward end of said torso support portion being open and a V-shaped cut-out portion being defined at a rearward end of said torso support portion and communicating with said hind legs support portion, said torso support portion further including a selectively closeable slit extending along a top portion of said torso support portion from the forward end of said torso support portion to a rearward end of said torso support portion;
    a neck brace attached to the open forward end of said torso support portion;

a pair of strap handles fixedly attached to respective sides of said torso support portion and extending around a bottom portion of said torso support portion; and first and second cooperating fastening means respectively disposed on an outside surface of said torso support portion and an inside surface of said torso support portion.

* * * * *